US010127551B2

(12) United States Patent
Dintenfass et al.

(10) Patent No.: US 10,127,551 B2
(45) Date of Patent: Nov. 13, 2018

(54) SYSTEM FOR MODELING AND IMPLEMENTING EVENT-RESPONSIVE RESOURCE ALLOCATION STRUCTURES

(71) Applicant: Bank of America Corporation, Charlotte, NC (US)

(72) Inventors: Katherine Dintenfass, Charlotte, NC (US); Damon C. Missouri, Trenton, NJ (US); Cameron Darnell Wadley, Waxhaw, NC (US); Alexander C. Wittkowski, Charlotte, NC (US); Alicia C. Jones-McFadden, Fort Mill, SC (US); Angela Fritz Thompson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 14/851,599

(22) Filed: Sep. 11, 2015

(65) Prior Publication Data
US 2017/0076283 A1    Mar. 16, 2017

(51) Int. Cl.
*G06Q 40/00*    (2012.01)
*G06Q 20/38*    (2012.01)
*G06Q 20/40*    (2012.01)
*G06Q 30/02*    (2012.01)

(52) U.S. Cl.
CPC ....... *G06Q 20/3825* (2013.01); *G06Q 20/405* (2013.01); *G06Q 30/0269* (2013.01)

(58) Field of Classification Search
CPC ................................................... G06Q 40/00
USPC ........................................................ 705/35
See application file for complete search history.

(56) References Cited

U.S. PATENT DOCUMENTS

| 5,930,764 | A |   | 7/1999  | Melchione et al. |
|-----------|---|---|---------|------------------|
| 5,983,205 | A |   | 11/1999 | Brams et al. |
| 6,009,415 | A |   | 12/1999 | Shurling et al. |
| 6,012,035 | A | * | 1/2000  | Freeman, Jr. ......... G06F 19/328 235/379 |
| 6,073,110 | A |   | 6/2000  | Rhodes et al. |
| 6,088,686 | A |   | 7/2000  | Walker et al. |
| 6,324,516 | B1 | * | 11/2001 | Shults ................... G06F 19/328 705/2 |
| 6,415,267 | B1 | * | 7/2002  | Hagan .................... G06Q 40/00 705/36 R |

(Continued)

FOREIGN PATENT DOCUMENTS

KR    20100116800 A    11/2010

OTHER PUBLICATIONS

European Patent Office, "Notice from the European Patent Office dated Oct. 1, 2007 concerning business methods" Official Journal EPO, Nov. 2007, p. 592.

(Continued)

*Primary Examiner* — Kirsten S Apple
(74) *Attorney, Agent, or Firm* — Michael A. Springs; Moore & Van Allen PLLC; Peter B. Stewart

(57) ABSTRACT

Embodiments of the invention are directed to systems, methods, and computer program products for implementing a change in a parameter associated with an event-responsive resource allocation structure, such as a named beneficiary, and predicting that the current parameters of an event-responsive resource allocation structure a unlikely to be congruent with a user's desired configuration of the parameters of the event-responsive resource allocation structure.

20 Claims, 4 Drawing Sheets

(56) References Cited

U.S. PATENT DOCUMENTS

| | | | |
|---|---|---|---|
| 6,513,018 B1 | 1/2003 | Culhane | |
| 6,826,536 B1* | 11/2004 | Forman | G06F 19/328 |
| | | | 705/3 |
| 6,901,406 B2 | 5/2005 | Nabe et al. | |
| 6,934,692 B1* | 8/2005 | Duncan | G06Q 20/10 |
| | | | 705/14.4 |
| 6,938,013 B1 | 8/2005 | Gutierrez-Sheris | |
| 7,155,411 B1 | 12/2006 | Blinn et al. | |
| 7,340,401 B1* | 3/2008 | Koenig | G06F 19/328 |
| | | | 600/300 |
| 7,356,516 B2* | 4/2008 | Richey | G06Q 10/087 |
| | | | 705/14.51 |
| 7,395,219 B2* | 7/2008 | Strech | G06Q 40/08 |
| | | | 705/4 |
| 7,401,040 B2 | 7/2008 | Sloan et al. | |
| 7,421,408 B2 | 9/2008 | Ryder | |
| 7,454,376 B1* | 11/2008 | Argenbright | G06Q 40/00 |
| | | | 705/35 |
| 7,454,379 B1 | 11/2008 | Wolzenski et al. | |
| 7,467,094 B2* | 12/2008 | Rosenfeld | G06F 19/327 |
| | | | 340/539.12 |
| 7,475,032 B1 | 1/2009 | Patnode et al. | |
| 7,490,059 B2 | 2/2009 | Albee et al. | |
| 7,542,921 B1 | 6/2009 | Hildreth | |
| 7,580,877 B1* | 8/2009 | Argenbright | G06Q 20/10 |
| | | | 705/35 |
| 7,627,512 B2 | 12/2009 | Harris et al. | |
| 7,657,441 B2* | 2/2010 | Richey | G06Q 10/087 |
| | | | 705/1.1 |
| 7,720,754 B1 | 5/2010 | Gutierrez-Sheris | |
| 7,783,545 B2 | 8/2010 | Sloan et al. | |
| 7,783,566 B2 | 8/2010 | Armes et al. | |
| 7,805,363 B2 | 9/2010 | Haggerty et al. | |
| 7,809,625 B1 | 10/2010 | Thermond et al. | |
| 7,844,523 B2 | 11/2010 | Torre et al. | |
| 7,848,939 B1 | 12/2010 | Martin | |
| 7,856,361 B1 | 12/2010 | Bell | |
| 7,873,566 B1 | 1/2011 | Templeton et al. | |
| 7,890,397 B1 | 2/2011 | Pena | |
| 7,899,750 B1 | 3/2011 | Klieman et al. | |
| 7,904,362 B1 | 3/2011 | Smith | |
| 7,921,048 B2 | 4/2011 | Sloan et al. | |
| 7,930,195 B2 | 4/2011 | Heyns et al. | |
| 7,937,305 B1 | 5/2011 | Lego et al. | |
| 7,987,101 B2 | 7/2011 | Cina et al. | |
| 8,024,213 B1 | 9/2011 | Fano et al. | |
| 8,032,932 B2 | 10/2011 | Speyer et al. | |
| 8,069,103 B1 | 11/2011 | Davis | |
| 8,121,947 B1 | 2/2012 | Barth et al. | |
| 8,171,531 B2 | 5/2012 | Buer | |
| 8,190,502 B2 | 5/2012 | Moran et al. | |
| 8,204,834 B2 | 6/2012 | Racanelli et al. | |
| 8,214,276 B1 | 7/2012 | Preece et al. | |
| 8,234,194 B2 | 7/2012 | Mele et al. | |
| 8,239,223 B1 | 8/2012 | Martin | |
| 8,249,985 B2 | 8/2012 | Giordano et al. | |
| 8,255,316 B2 | 8/2012 | Bal et al. | |
| 8,271,364 B2 | 9/2012 | Nobili et al. | |
| 8,301,469 B1 | 10/2012 | Veldhuizen et al. | |
| 8,301,501 B1 | 10/2012 | Glaeser et al. | |
| 8,327,428 B2 | 12/2012 | Bailey et al. | |
| 8,346,666 B2 | 1/2013 | Lindelsee et al. | |
| 8,370,243 B1 | 2/2013 | Cernyar | |
| 8,380,544 B2 | 2/2013 | Hopkins, III | |
| 8,407,142 B1 | 3/2013 | Griggs | |
| 8,429,050 B2 | 4/2013 | Willard et al. | |
| 8,447,692 B2 | 5/2013 | Thomas et al. | |
| 8,473,410 B1 | 6/2013 | Haggerty et al. | |
| 8,498,940 B2 | 7/2013 | Pelegero et al. | |
| 8,527,382 B2 | 9/2013 | McDonough et al. | |
| 8,538,875 B2 | 9/2013 | Seib et al. | |
| 8,572,689 B2 | 10/2013 | Radhakrishnan | |
| 8,590,008 B1 | 11/2013 | Ellmore | |
| 8,595,812 B2 | 11/2013 | Bomar et al. | |
| 8,666,836 B2 | 3/2014 | Adams | |
| 8,682,753 B2 | 3/2014 | Kulathungam | |
| 8,731,583 B2 | 5/2014 | Wengrovitz | |
| 8,732,004 B1 | 5/2014 | Ramos et al. | |
| 8,751,346 B2 | 6/2014 | Maisonneuve | |
| 8,768,736 B1 | 7/2014 | Chapman et al. | |
| 8,788,429 B2 | 7/2014 | Tieken | |
| 8,789,162 B2 | 7/2014 | Radhakrishnan | |
| 8,833,639 B1 | 9/2014 | Hopkins, III | |
| 8,839,383 B2 | 9/2014 | Van Horn | |
| 8,903,739 B1 | 12/2014 | Janiczek | |
| 8,918,306 B2* | 12/2014 | Cashman | H04L 63/08 |
| | | | 703/2 |
| 8,930,253 B1 | 1/2015 | Ball | |
| 8,943,574 B2 | 1/2015 | Bailey et al. | |
| 9,055,053 B2 | 6/2015 | Radhakrishnan | |
| 9,064,284 B1 | 6/2015 | Janiszeski et al. | |
| 9,069,943 B2 | 6/2015 | Radhakrishnan et al. | |
| 2002/0049670 A1* | 4/2002 | Moritsu | G06Q 20/04 |
| | | | 705/40 |
| 2002/0077867 A1* | 6/2002 | Gittins | G06Q 30/02 |
| | | | 705/4 |
| 2002/0147669 A1 | 10/2002 | Taylor et al. | |
| 2002/0178100 A1 | 11/2002 | Koveos | |
| 2003/0130873 A1* | 7/2003 | Nevin | G06F 19/328 |
| | | | 705/3 |
| 2003/0225690 A1* | 12/2003 | Eaton | G06Q 20/102 |
| | | | 705/40 |
| 2003/0233292 A1* | 12/2003 | Richey | G06Q 10/087 |
| | | | 705/28 |
| 2004/0078321 A1 | 4/2004 | Lawrence | |
| 2004/0153382 A1* | 8/2004 | Boccuzzi | G06Q 30/04 |
| | | | 705/34 |
| 2005/0027544 A1 | 2/2005 | Newstead et al. | |
| 2005/0044017 A1 | 2/2005 | Foss, Jr. et al. | |
| 2005/0044028 A1 | 2/2005 | Torres | |
| 2005/0055275 A1 | 3/2005 | Newman et al. | |
| 2005/0267827 A1 | 12/2005 | Grant, Jr. et al. | |
| 2005/0288941 A1 | 12/2005 | DuBois et al. | |
| 2006/0074788 A1 | 4/2006 | Grizack et al. | |
| 2007/0192143 A1* | 8/2007 | Krishnan | G06Q 10/10 |
| | | | 705/3 |
| 2007/0219875 A1 | 9/2007 | Toulotte | |
| 2008/0046349 A1 | 2/2008 | Elberg et al. | |
| 2008/0059351 A1* | 3/2008 | Richey | G06Q 10/087 |
| | | | 705/35 |
| 2009/0063199 A1 | 3/2009 | Chien et al. | |
| 2009/0083638 A1 | 3/2009 | Gupta | |
| 2010/0138359 A1 | 6/2010 | Alter | |
| 2010/0161467 A1 | 6/2010 | Ageenko et al. | |
| 2010/0161600 A1 | 6/2010 | Higgins et al. | |
| 2010/0268645 A1 | 10/2010 | Martino et al. | |
| 2010/0274687 A1 | 10/2010 | Ghosh et al. | |
| 2011/0035239 A1 | 2/2011 | Scheinerman et al. | |
| 2011/0161168 A1 | 6/2011 | Dubnicki | |
| 2011/0238553 A1 | 9/2011 | Raj et al. | |
| 2012/0016817 A1 | 1/2012 | Smith et al. | |
| 2012/0053987 A1 | 3/2012 | Satyavolu et al. | |
| 2012/0101852 A1 | 4/2012 | Albert | |
| 2012/0166285 A1 | 6/2012 | Shapiro et al. | |
| 2012/0284201 A1 | 11/2012 | Racanelli et al. | |
| 2013/0060617 A1 | 3/2013 | Ross et al. | |
| 2013/0066754 A1 | 3/2013 | Atwood | |
| 2013/0159132 A1 | 6/2013 | Adams | |
| 2013/0290198 A1 | 10/2013 | Vassil | |
| 2014/0081816 A1 | 3/2014 | Kuznetsov | |
| 2014/0081885 A1 | 3/2014 | Maxwell, II | |
| 2014/0101060 A1 | 4/2014 | Calman et al. | |
| 2014/0115064 A1 | 4/2014 | Calman et al. | |
| 2014/0143076 A1 | 5/2014 | Gangi | |
| 2014/0164287 A1 | 6/2014 | Hyde et al. | |
| 2014/0310142 A1 | 10/2014 | Mak | |
| 2014/0330691 A1 | 11/2014 | Samano Palacios | |
| 2014/0379272 A1 | 12/2014 | Sathe | |
| 2015/0081405 A1 | 3/2015 | Ross et al. | |
| 2015/0206055 A1 | 7/2015 | Sengupta et al. | |
| 2016/0110813 A1 | 4/2016 | Hayden | |

(56) References Cited

U.S. PATENT DOCUMENTS

2016/0267601 A1 9/2016 Kundu
2016/0379298 A1* 12/2016 Isaacson ................ G06Q 20/12
705/26.62
2017/0076283 A1* 3/2017 Dintenfass ......... G06Q 20/3825

OTHER PUBLICATIONS

Jordan, Arthur, "Database Marketing Builds in Relationships with Members," Credit Union News (May 5, 1995), vol. 15, Issue 9, retrieved from the internet on May 8, 2012, 2 pages.
"Putting Customer Benefit First—to Provide Faster ROA-SAS Institute's Data Warehousing Practice Solves Business Problems", Copyright Business Wire, May 19, 1998, retrieved from the internet on May 8, 2012, 3 pages.
Synder, Daniel, "From List Fatigue to Relationship Marketing: The Credit Card industry Reassesses Its Direct Mail Strategies", Credit World, (Nov./Dec. 1997), pp. 27-30.
Marie Murdock, Power of Attorney Between a Husband and Wife, published online Apr. 24, 2015 retrieved from https://web.archive.org/web/20150324182735/https://info.legalzoom.conn/power-attorney-between-husband-wife-20171.html (Year: 2015), 1 page.
How to Combine Finances with Your Partner, LearnVest, Sep. 10, 2012, Forbes.com, entire document, retrieved May 25, 2017 from https://www.forbes.com/sites/learnvest/2012/09/10/how-to-combine-finances-with-your-partner/#3e6e503e22c7 (Year: 2012), 7 pages.

* cited by examiner

SYSTEM FOR MODELING AND IMPLEMENTING EVENT-RESPONSIVE RESOURCE ALLOCATION STRUCTURES

BACKGROUND

Planning for and determining how one's resources and assets will be dispersed is an important aspect of a user's decision regarding the allocation of the user's resources. However, while users increasingly tend to direct their resources into disparate structures and experience increased life spans, the technology associated with asset allocation is still a limited area.

BRIEF SUMMARY

Embodiments of the present invention address the above needs and/or achieve other advantages by providing apparatuses (e.g., a system, computer program product, and/or other device) and methods for a system that enables an individual user to implement an event-responsive resource allocation structure (e.g., an insurance policy, investment vehicle, savings account, other financial account, or the like) such that the identification of the beneficiary of that event-responsive resource allocation structure reflects the preferences of the user, in order to accommodate changes in a user's plans, relationships, domicile, or other circumstances.

Embodiments of the invention comprise systems, computer program products, and methods for implementing a change to the beneficiary of an event-responsive resource allocation structure. These embodiments comprise receiving a request from a user to change an identification of a beneficiary of an event-responsive resource allocation structure, wherein the request is received via a transmission sent from a user device associated with the user; establishing a first communication channel between the user device and the communication device; determining that the user is a holder of the event-responsive resource allocation structure and that the user is authorized to change the identification of the beneficiary of the event-responsive resource allocation structure; prompting the user to provide a confirmation of the identity of the user; receiving, via the first communication channel the confirmation of the identity of the user, wherein the confirmation of the identity of the user comprises an image of a signature of the user; extracting data from the confirmation of the identity of the user, wherein the data comprises text-recognition data; calculating a confidence rating based at least in part on a comparison of the image of the signature of the user and the data extracted from the confirmation of the identity of the user to a predetermined template associated with the user; determining that the confidence rating exceeds a predetermined confidence threshold; responsive to determining that the confidence rating exceeds the predetermined confidence threshold, prompting the user for information regarding the change in the identification of the beneficiary of the event-responsive resource allocation structure; establishing a second communication channel between the communication device and a system associated with an institution associated with the event-responsive resource allocation structure; and transmitting, via the second communication channel, instructions to change the identification of the beneficiary of the event-responsive resource allocation structure, wherein the instructions comprise the information regarding the change in the identification of the beneficiary of the event-responsive resource allocation structure and the image of the signature of the user.

In some illustrative examples, embodiments further comprise receiving a set of transaction information associated with the user, wherein the set of transaction information associated with the user comprises data associated with a transaction amount, a transaction location, and a merchant name.

In some such illustrative examples, and in other examples, embodiments further comprise determining, based at least in part on the set of transaction information associated with the user, that a probability that the user will request to change the identification of the beneficiary of the event-responsive resource allocation structure is above a predetermined probability threshold.

In some such illustrative examples, and in other examples, embodiments further comprise transmitting a notification to the user indicating that the probability that the user will request to change the identification of the beneficiary of the event-responsive resource allocation structure is above a predetermined probability threshold.

In some such illustrative examples, and in other examples, embodiments further comprise transmitting to the user a first message associated with the identification of the beneficiary of the event-responsive resource allocation structure; and transmitting to the user a second message associated with the identification of the beneficiary of the event-responsive resource allocation structure, wherein the second message is sent after a predetermined interval of time has passed after the transmission of the first message.

In some such illustrative examples, and in other examples, embodiments further comprise transmitting to the user an offer of a reward associated with the identification of the beneficiary of the event-responsive resource allocation structure.

In some such illustrative examples, and in other examples, embodiments further comprise establishing a third communication channel between the communication device and a system associated with an individual authorized to verify a signature document; transmitting to the individual authorized to verify the signature document the image of the signature and an image of a government-issued identification document associated with the user via the third communication channel; and receiving from the individual authorized to verify the signature document an indication that the individual has verified the signature of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
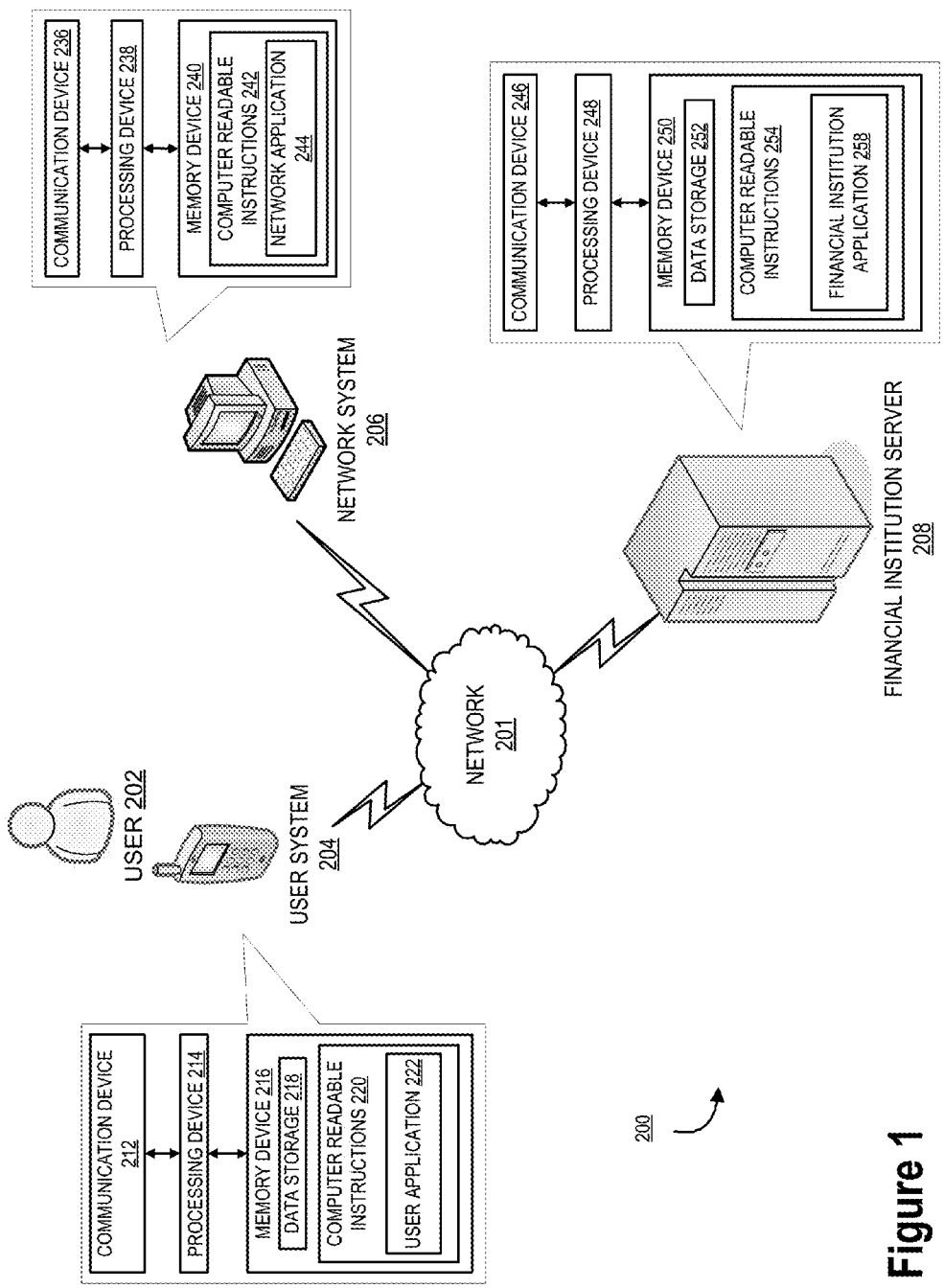
Figure 2A:
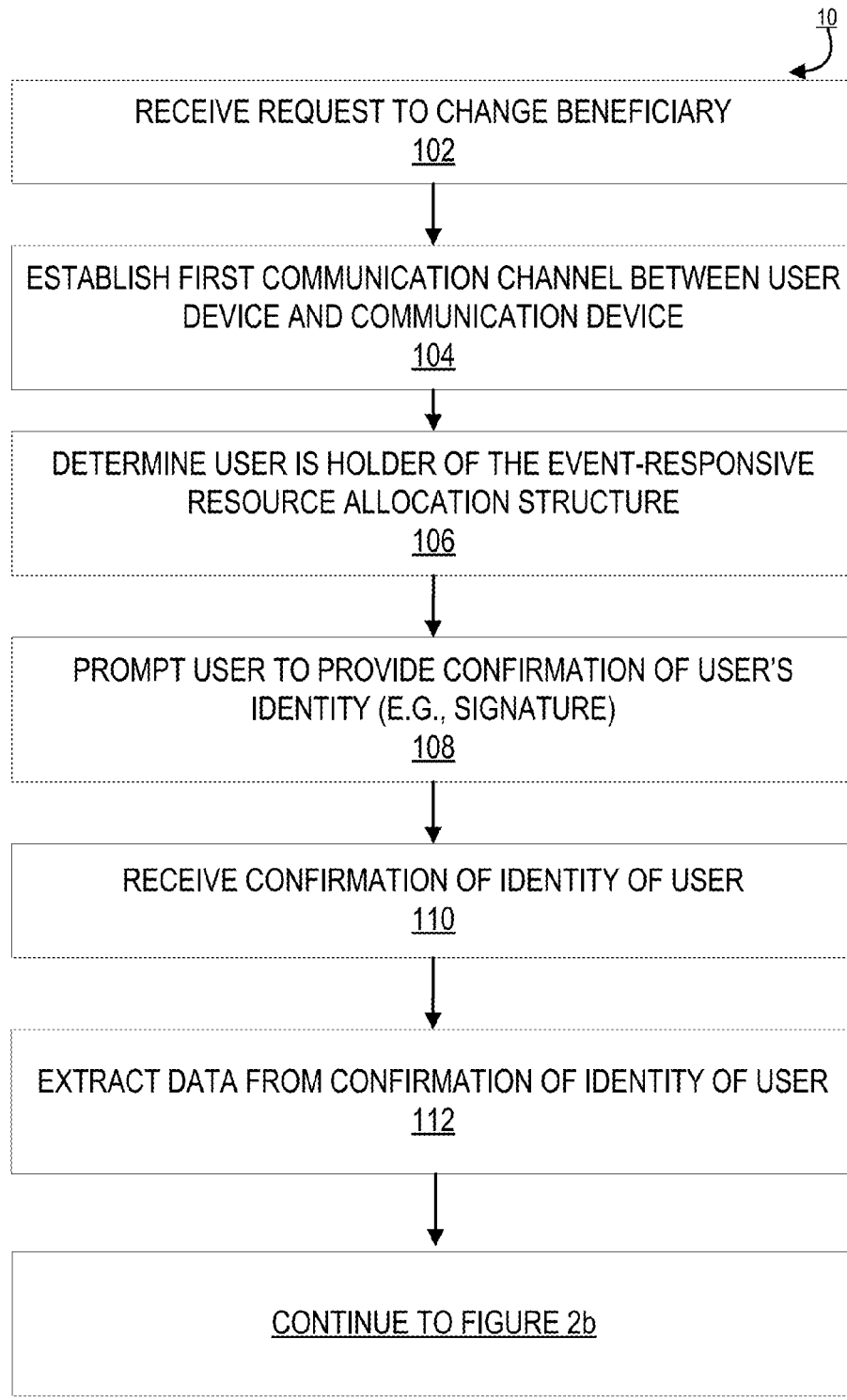
Figure 2B:
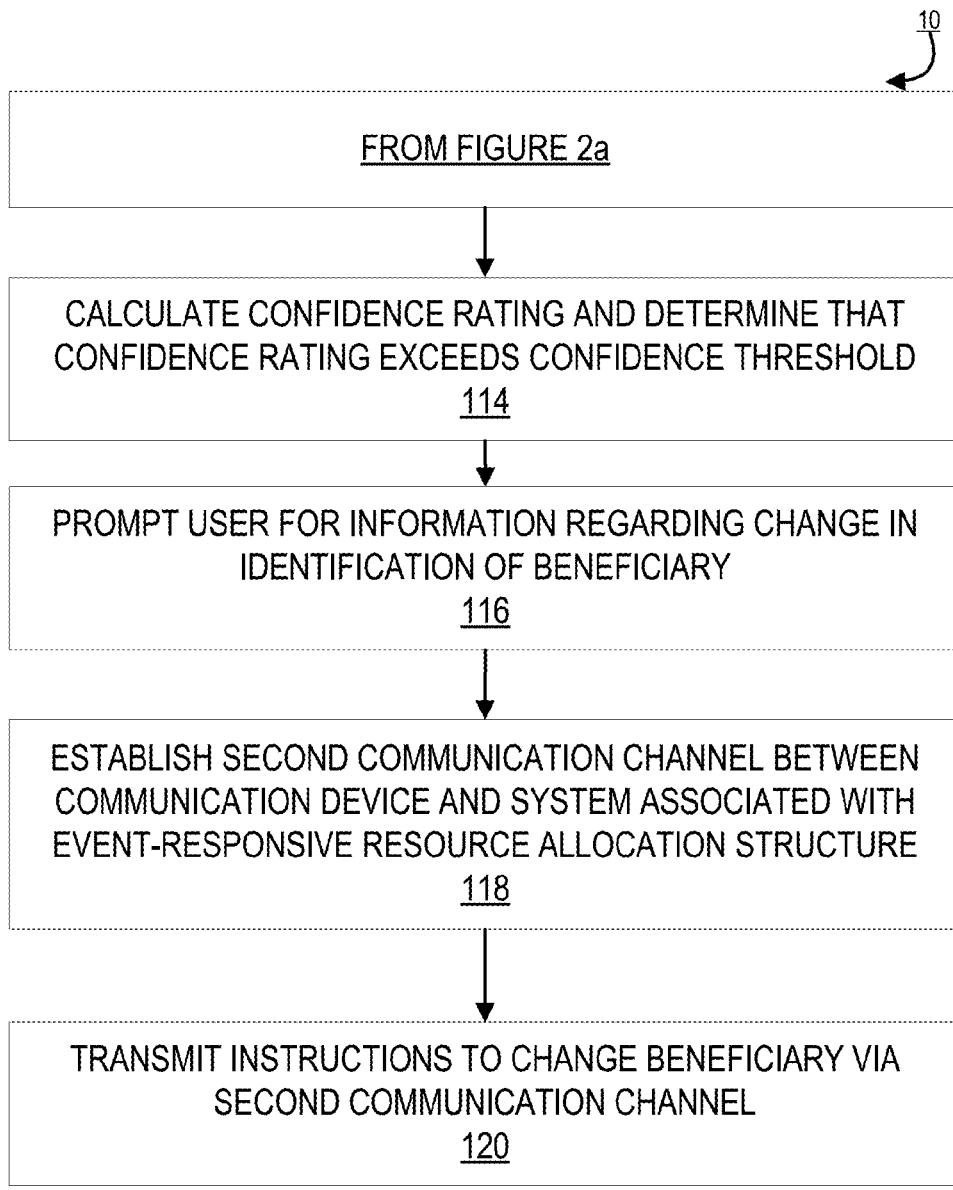
Figure 3:
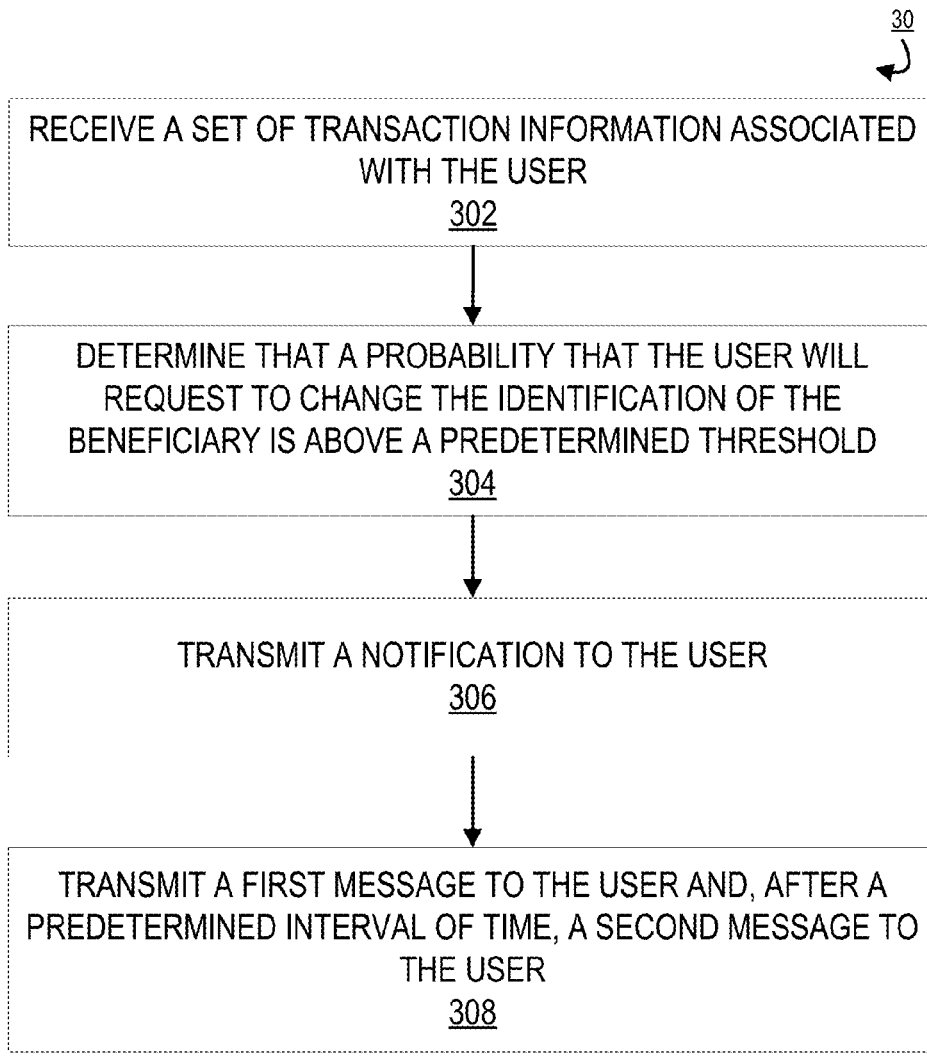

Having thus described embodiments of the invention in general terms, reference will be made to the accompanying drawings, where:

FIG. 1 presents a block diagram of the event-responsive resource allocation structure system environment for implementing the process flows described herein, in accordance with embodiments of the present invention;

FIGS. 2a and 2b illustrate a process flow for implementing a modification to the identification of a beneficiary of an event-responsive resource allocation structure, in accordance with embodiments of the present invention; and FIG. 3 illustrates process flow for implementing additional aspects of an event-responsive resource allocation structure, in accordance with embodiments of the present invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention, the financial institution described herein may be replaced with other types of businesses that may be associated with an event-responsive resource allocation structure.

Some portions of this disclosure are written in terms of a financial institution's unique position with respect to user transactions. As such, a financial institution may be able to utilize its unique position to monitor and identify transactions for products or with merchants that utilize financial institution accounts to complete the transactions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with implementation and modification of event-responsive resource allocation structures.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant modification of an event-responsive resource allocation structure and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

As used herein, the term "event-responsive resource allocation structure" refers to any structure that allocates resources in response to the occurrence of an event. A paradigmatic event-responsive resource allocation structure is a bank account configured to include the identification of a beneficiary associated with the account. Upon the occurrence of an event (for example, the beneficiary achieves the age of majority, the account holder pre-deceases the beneficiary, or some other identifiable event), all or part of the resources stored in the account are transferred to the beneficiary. Other example event-responsive resource allocation structures include, but are not limited to, savings accounts, checking accounts, investment accounts, other financial institution accounts, insurance policies, retirement accounts, trust accounts, 529 plans and other educational savings vehicles, and other accounts or stores of value that are structured such that all or part of the contents or value of the account are transferred to a named beneficiary upon the occurrence of an event.

Embodiments of the present invention are directed toward implementing aspects of event-responsive resource allocation structures. Historically, the transfer of the accumulated assets of an individual involved primarily the passing, via a will or by the operation of law, specific, tangible items from one person to another. For example, family members might have passed ownership of a family heirloom, home, land, or other possessions to each other in accordance with the current wishes and plans of the owner and/or the particular situation.

In modern times, an ever-increasing portion of the assets and other resources accumulated by an individual over the course of a lifetime are stored in accounts, insurance policies, and other structures that are held, managed, or otherwise administered by third-party institutions. Moreover, some individuals accumulate resources in structures that they may not actively monitor or recall, such as insurance policies provided as a benefit by an employer, or an employer-based retirement, pension and/or profit sharing plan associated with previous employment. Many of these structures are event-responsive resource allocation structures, in the sense that they require the identification of a beneficiary to whom the accumulated assets should be provided upon the occurrence of a predetermined event.

In view of an increasingly mobile population, including an increase in the number of individuals who switch their places of employment and/or chosen career with a degree of frequency, it can be difficult for an individual to keep track of all of the various event-responsive resource allocation structures in which they have accumulated assets, and the identification of the beneficiaries for those structures.

Compounding this difficulty is the increase in lifespan enjoyed by modern individuals. Historically, if any future planning was adopted with respect to an individual's resources, the time horizon associated with that planning was typically short, and limited to focusing on the needs of a contemporary spouse and/or the individual's immediate descendants. Today, as many individuals live to see their grandchildren and great-grandchildren reach adulthood, plans that were established by an individual earlier in life may become incongruent with the individual's later-developed relationships, needs, interests, and plans. For example, an individual may, at a young age, identify a parent or sibling as a beneficiary of an account. As that individual ages, that individual may become married, and choose to name the spouse as the beneficiary of the account. Still later, the individual may intend that children, grandchildren, or younger relatives be the beneficiary of the account. Alternatively, the individual's plans or situation may be such that the individual wishes to have another entity, such as a school, church, or charitable organization, be the beneficiary. Notwithstanding the intentions of the individual, in many situations, a formal change to the identification of the beneficiary of the account is necessary to allow the institution responsible for holding and administering the account to provide the resources stored therein to the individual's intended beneficiary. In situations where an individual loses track of their event-responsive resource allocation structures, and particularly in situations where a listed beneficiary is no longer the intended recipient of the resources, it can be costly, inefficient, and in some situations, impossible, to redirect the resources after the triggering event has occurred.

Consequently, the embodiments of the invention claimed and otherwise described herein are directed to solutions that assist an individual in ensuring that event-responsive resource allocation structures held by the individual are configured such that the individual's intended beneficiary is properly identified to the institution associated with the event-responsive resource allocation structure, and, where necessary changing the identification of the beneficiary associated with the event-responsive resource allocation structure.

FIG. 1 illustrates a system environment 200, for use in connection with the implementation and modification of one or more event-responsive resource allocation structures in accordance with one embodiment of the present invention. FIG. 1 provides the system environment 200 for which example instances of the elements and/or processes described herein may be implemented. FIG. 1 provides a unique system that includes specialized servers and systems communicably linked across a distributive network that may allow a user, via a user's mobile device, to communicate with systems and servers associated with one or more entities and institutions associated with an event-responsive resource allocation structure and/or the processes described and disclosed herein. The system environment 200 may also provide for the authorization and authentication of a user. The system, with its communicably linked network may, in some embodiments, improve a general computing device if utilized thereon by improving the ability for the computer device to access and securely transmit and/or present information associated with an event-responsive resource allocation structure, particularly with respect to the identification of a beneficiary thereof. Furthermore, in some embodiments, the system may be, as described below, run on a network of specialized nodes meant for implementing a change in the identification of a beneficiary of an event-responsive resource allocation structure.

As illustrated in FIG. 1, the financial institution server 208 is operatively coupled, via a network 201 to the user system 204, and to the network system 206. In this way, the financial institution server 208 can send information to and receive information from the user system 204 and the network system 206 to implement a change in the identification of a beneficiary of an event-responsive resource allocation structure associated with a user upon user device authentication. FIG. 2 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system-specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual consumer that is associated with an event-responsive resource allocation structure. In some embodiments, the user 202 may interact with an event-responsive resource allocation structure, such as a savings account or other similar structure, using a user system 204.

FIG. 1 also illustrates a user system 204. The user system 204 generally comprises a communication device 212, a processing device 214, and a memory device 216. The user system 204 is a computing system that allows a user 202 to interact with the financial institution and/or other institution to access an event-responsive resource allocation structure and implement changes thereto, such as changing the identification of a beneficiary associated therewith. The processing device 214 is operatively coupled to the communication device 212 and the memory device 216. The processing device 214 uses the communication device 212 to communicate with the network 201 and other devices on the network 201, such as, but not limited to the network system 206 and the financial institution server 208. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a user application 222. In this way, a user 202 may interact and change parameters associated with an event-responsive resource allocation structure using the user system 204 via an application operating on the user system 204. Furthermore, the user application 222 may receive a token from the financial institution server 208 or network system 206 and be stored on the memory device 216 of the user system 204. The user system 204 via the user application 222 may decrypt the token to access information required to complete a change to an aspect of an event-responsive resource allocation structure and/or otherwise access an event-responsive resource allocation structure. The user system 204 may be, for example, a desktop personal computer, a mobile system, such as a cellular phone, smart phone, personal data assistant (PDA), laptop, or the like.

As further illustrated in FIG. 1, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the network system 206 and the user system 204. As such, the communication device 246 generally comprises a modem, server, or other device for communicating with other devices on the network 201.

As further illustrated in FIG. 1, the financial institution server 208 comprises computer-readable instructions 254 stored in the memory device 250, which in one embodiment includes the computer-readable instructions 254 of a financial institution application 258. In some embodiments, the memory device 250 includes data storage 252 for storing data related to the system environment, but not limited to data created and/or used by the financial institution application 258.

In the embodiment illustrated in FIG. 1 and described throughout much of this specification, the financial institution application 258 may allow for modification of parameters and/or other aspects of an event-responsive resource allocation structure, contact user system 204 for security confidence, and/or push a token to user system 204 for storage and decryption on user system 204 for use in connection with implementing a change to an event-responsive resource allocation structure.

In some embodiments, the financial institution application 258 may allow for approval of a change to an event-responsive resource allocation structure. In some embodiments, the financial institution application 258 may receive a request to change the identification of a beneficiary of an event-responsive resource allocation structure via the network 201 from the user 202 via the user system 204. The financial institution application 258 may approve the request after the request is submitted based on a stored standardized request acceptance criteria stored in the memory 250. In some embodiments, this approval by the financial institution application 258 may be instantaneous upon receiving the request.

In some embodiments, the financial institution application 258 may present approval to an online application associated with the user 202. As such, once the financial institution application 258 has approved the request from user 202 to change the identification of a beneficiary, the financial institution application 258 may provide information about accessing and authorizing the use of the event-responsive resource allocation structure. The financial institution application 258 may provide this information via an online banking interface associated with the financial institution server 208 and the user's accounts at the financial institution. As such, the financial institution application 258 may provide the user 202 with the information via communication over the network 201 via data feeds to the user system 204. Once the user 202 is authenticated into an online application platform, the financial institution application 258 may provide information about accessing and authorizing the use of the event-responsive resource allocation structure instantaneously.

In some embodiments, the financial institution application 258 may receive other information about the user 202, such as transaction information and/or information posted by the user 202 on publicly available sources, or from sources that the user 202 has specifically authorized the one or more institutions to view. As such, the financial institution application 258 may receive network data feeds or communications from the user 202 via a user system 204 over the network 201.

In some embodiments, the financial institution application 258 may determine the unique identity of the user system 204 and/or other devices associated with the request to change an identification of a beneficiary associated with an event-responsive resource allocation structure and contact the devices for security confidence. In some embodiments, the financial institution application 258 may communicate with the user system 204 and/or other systems to identify the user system 204 and/or the user 202. The financial institution application 258 may then initiate a security check on the devices. The security check generates a security confidence rating to confirm that the device requesting change to the event-responsive resource allocation structure is a device associated with the user and is not corrupted with viruses, malware, or the like. As such, the financial institution application 258 communicates and provides codes for download on the user system 204 that maybe encrypted and subsequently decrypted by the user system 204 for system monitoring and malware searching. As such, the security check and subsequently generated security confidence rating ensures that misappropriation of an event-responsive resource allocation structure cannot occur. As such, the security check may, in some embodiments, provide code and/or access information about the requesting device, based on the identifier of each device. The financial institution application 258 may confirm the operating system of the device, the health of the device, and determine an IP address or location match between the devices the user uses to log into online banking applications and the requesting device. In some embodiments, the financial institution application 258 may generate a security confidence rating based on the security check that rates the security of authorizing the change in the beneficiary of the event-responsive resource allocation structure.

As illustrated in FIG. 2, the network system 206 is connected to the financial institution server 208 and may be associated with an institution responsible for an event-responsive resource allocation structure, or, in other example implementations, an individual or group of individuals qualified to verify and identity and/or a signature or signed document associated with the user 202. In this way, while only one network system 206 is illustrated in FIG. 1, it is understood that multiple network systems may make up the system environment 200. The network system 206 generally comprises a communication device 236, a processing device 238, and a memory device 240. The network system 206 comprises computer-readable instructions 242 stored in the memory device 240, which in one embodiment includes the computer-readable instructions 242 of a network application 244.

In the embodiment illustrated in FIG. 1, the network application 244 provides, in some embodiments, token creation and distribution. In some embodiments the network application 244 may create and distribute a token for storage on the user system 204 and financial institution server 208. The token may include code therein that includes authorization information associated with an event-responsive resource allocation system. As such, the token may be stored in the memory 216 of the user system 204 and subsequently decrypted to be used by the user system 204 as an indicator of the identity and authority of the user 202 to change one or more parameters of an event-responsive resource allocation structure, such as the identification of the beneficiary. The token may also be stored and decrypted by the financial institution system 208 for reconciliation and processing of a request from the user 202 to change a parameter of an event-responsive resource allocation structure.

It is understood that the servers, systems, and devices described herein illustrate one embodiment of the invention. It is further understood that one or more of the servers, systems, and devices can be combined in other embodiments and still function in the same or similar way as the embodiments described herein.

FIGS. 2a and 2b provide a high-level process flow illustrating the implementation of a process 10 to change the identification of a beneficiary associated with an event-responsive resource allocation structure in accordance with one embodiment of the invention. As illustrated in block 102, the process may be initiated upon receipt from a user a request to change an identification of a beneficiary of an event-responsive resource allocation structure. In example implementations, the identification of the beneficiary of an event-responsive resource allocation structure can be any identification information sufficient to identify the individual that the user intends to be the beneficiary associated with the event-responsive resource allocation structure, such as a name, mailing address, numerical identifier, and/or a relationship label (for example, "spouse", "child", or "sibling"). In some such example implementations, there may be requirements imposed by one or more institutions associated with the event-responsive resource allocation structure on the categories of information and the degree of specificity that must be provided to identify the intend beneficiary.

In most example implementations of block 102, the request received from the user is received via a transmission sent from a user device associated with the user, such as a mobile device associated with the user. In some such example implementations, the mobile device may be configured to execute an application specifically designed to implement the process 10 and/or additional actions associated with the event-responsive resource allocation structure.

As depicted in block 104, process 10 comprises establishing a first communication channel between the user device and a communication device. In some example implementations, the communication channel can be established over an air interface or wireless interface, as in the case of implementations involving a mobile device, or over a wired connection. Regardless of the nature of the implementation of the communication channel (for example, wired, wireless, and/or a combination of both), the communication channel can, in some example implementations, be configured to be a secure channel, an encrypted channel, a dedicated channel, or a conventional channel, and exhibit any of the traits associated with communications channels known to those skilled in the art. Any of the communication devices described with respect to FIG. 1, and any such similar devices, or combinations thereof can be used as the communication device in example implementations of block 104.

As depicted in block 106, process 10 comprises determining that the user is a holder of the event-responsive resource allocation structure and that the user is authorized to change the identification of the beneficiary of the event-responsive resource allocation structure. In some example implementations, the determination contemplated in block 106 can be accomplished by authenticating the user.

As depicted in block 108, process 10 comprises prompting the user to provide a confirmation of the identity of the user. In many instances, preexisting rules imposed on event-responsive resource allocation structures require that a user provide additional indicia of their identity beyond that required to preliminarily identify the user as described with respect to block 106. For example, some institutions may require that the user provide a signature and/or complete a physical, paper form in order to effectuate the change in beneficiary. Additionally, in implementations where the event-responsive resource allocation structure is associated with an institution that does not recognize or have access to the authentication data and/or protocols discussed above with respect to block 106, additional indicia of the user's identity may be necessary to satisfy the requirements of such an institution.

Next, as depicted in block 110, process 10 comprises receiving, via the first communication channel, the confirmation of the identity of the user, wherein the confirmation of the identity of the user comprises an image of a signature of the user. In example implementations of block 110, such as those wherein the user is using a mobile device equipped with a camera, the image of the signature of the user can be captured using such a camera. In other example implementations, such as those where the user must fill out a specific paper form in order to comply with the rules previously set governing the particular event-responsive resource allocation structure, the user may alternatively sign and scan the form to create the image of the user's signature. In still other example implementations, the user may have captured or caused to be captured an image of the user's signature, either in connection with implementation of process 10 and/or at a previous time.

After receiving the confirmation of the identity of the user, process 10 comprises, as depicted in block 112, extracting data from the confirmation of the identity of the user, wherein the data comprises text-recognition data. In example implementations of block 112, text-recognition techniques, algorithms, and/or software may be applied to the image of the signature received from the user and on any other text supplied by the user in connection therewith. For example, such additional text may include a typed or printed version of the user's name. Even if no additional text is supplied with the signature, text recognition data may nonetheless be extracted from the signature itself and may be used to provide further degree of certainty regarding the authenticity of the signature and the identity of the user.

As depicted in block 114, process 10 comprises calculating a confidence rating based at least in part on a comparison of the image of the signature of the user and the data extracted from the confirmation of the identity of the user to a predetermined template associated with the user, and determining that the confidence rating exceeds a predetermined confidence threshold. In some example implementations of block 114, the image of the signature of the user is compared against a version of the user's signature that is known to be authentic. For example, the user may have provided an in-person, verified signature when the event-responsive resource allocation structure was initiated, thus creating a template against which other signatures purporting to be that of the user can be compared. In some example implementations, the text-recognition data extracted from the signature may be sufficient to establish that the signature of the user is likely genuine. In some example implementations, the predetermined confidence threshold is set by the institution associated with the event-responsive resource allocation structure. However, those skilled in the art will appreciate that any approach to comparing a signature and/or data extracted therefrom to a template for the purposes of confirming the authenticity of the signature can be used in example implementations of block 114.

As depicted in block 116, the process comprises, responsive to determining that the confidence rating exceeds the predetermined confidence threshold, prompting the user for information regarding the change in the identification of the beneficiary of the event-responsive resource allocation structure. Those skilled in the art will appreciate that some processing time may be necessary, particularly in implementations where systems associated with multiple independent entities are queried in order to confirm the identity and/or signature of the user. In some example implementations of block 116, prompting the user comprises transmitting to the user's mobile device an interactive form, wherein the user can type, select entries from menus, and/or otherwise input data associated with the identification of the beneficiary of the event-responsive resource allocation structure. For example, if the user is changing the identification of the beneficiary, the user may be prompted to enter the name, address, telephone number, and/or other information that would allow an institution to readily identify and locate a beneficiary upon the occurrence of an event associated with an event-responsive resource allocation structure. In other example implementations, such as those where an institution requires that a physical, paper form be completed, the user may be prompted to transmit an image of the completed form and/or a digital version of the form.

In some example implementations of block 116, the information regarding the change in the identification of the beneficiary of the event-responsive resource allocation structure will be checked against rules associated with the event-responsive resource allocation structure. For example, there may be local regulations regarding the identify, specificity of identification, or other aspects of the identification of the beneficiary imposed on an event-responsive resource allocation structure based on geographically local regulations, rules imposed by the institution associated with the event-responsive resource allocation structure, or rules imposed by some other entity. In such example implementations, the information provided by the user can be checked against such rules to ensure that the information provided by the user complies with the rules and is otherwise sufficient to satisfy applicable requirements.

In some such example implementations, and in other example implementations, the information provided by the user may be checked against any of a number of other sources of information to confirm the accuracy of the information. For example, information derived from public records, social media information, other information available to the institution associated with the event-responsive resource allocation structure, and/or other information provided by the user may be compared against the information provided by the user regarding the identification of the beneficiary. In one such example implementation, a user may identify a business partner as a beneficiary of an account that the user uses for business expenses. When the user provides information attempting to identify the business partner as the beneficiary, public records filed in connection with the business may be compared to the information provided by the user to identify any inconsistencies, typographical errors, or other potential issues that may suggest that the user has provided inaccurate information and/or information that may be inconsistent with the user's preferences or intentions. In other example implementations, social media data and/or a user's contacts information may be used as data for comparison purposes to confirm the name, address, contact information and/or other information of an individual, such as when a user identifies a sibling, friend, or other individual as a beneficiary.

As depicted in block 118, process 10 comprises establishing a second communication channel between the communication device and a system associated with an institution associated with the event-responsive resource allocation structure. Those skilled in the art will appreciate that any of a number of institutions may be associated with one or more event-response resource allocation structures, such as banks or other financial institutions, insurance companies, investment companies, brokerages, and/or other similar institutions. Such institutions may choose to establish systems and/or servers accessible via a network, similar to the systems and servers discussed above with reference to FIG. 1. Similarly, any of the types or configurations that would be appropriate for use as the first communication channel discussed earlier with respect to block 104, may be used in connection with example implementations of block 118.

As depicted in block 120, process 10 comprises transmitting, via the second communication channel, instructions to change the identification of the beneficiary of the event-responsive resource allocation structure, wherein the instructions comprise the information regarding the change in the identification of the beneficiary of the event-responsive resource allocation structure and the image of the signature of the user.

In some example implementations of process 10, additional steps not specifically depicted in FIG. 2 may be performed. For example, some institutions associated with event-responsive resource allocation structures may require third-party verification of a signature of a user, such as that provided by a notary public or other person qualified to verify the identity and signature of an individual. In some such example implementations, a third communication channel may be established between the communication device and a system associated with an individual authorized to verify a signature document. Documentation, such as the image of the user's signature and an image of a government-issued identification document or other identification document associated with the user can be transmitted via the third communication channel. After the notary or other individual authorized to verify a signature document has confirmed the identity and signature of the user, the process may comprise receiving from the individual authorized to verify the signature document an indication that the individual has verified the signature of the user. For example, a notary may send a digital version of their seal, a statement setting forth their belief in the authenticity of the signature, and/or some other indicia of approval.

In some example implementations, changes made by a user to the identification of a beneficiary are stored and/or documented to create, for example, an historical record of changes made by the user. In some situations such an historical record may be useful when ascertaining how a user's interests and goals have changed over time, and may provide additional information regarding the timing and sequencing of changes made by a user with respect to the occurrence of events associated with an event-responsive resource allocation structure.

In addition to enabling a user to change the identification of a beneficiary of an event-responsive resource allocation structure, some example implementations contemplate predicting when an individual may want to consider changing the identification of the beneficiary. For example, when a user gets married, moves to a different home, changes careers, has children, or experiences other life events, the user may make statements on publicly viewable websites, such as social media sites, or change their normal purchasing patterns. If a user were to move to a different residence, for example, the user might switch to a different grocery store, gas station, or other merchants that are more conveniently located with respect to the new residence. Similarly, some changes in life circumstances are often correlated with changes in purchasing behavior, such as when a new parent purchases children's clothing or other items needed by a child. Moreover, other information, such as public records, social media information, purchasing data, other transaction data, information provided to an institution by the user, and/or data associated with a particular age cohort, geographic region, census data, and/or other sets of factors may be used to determine that there is a likelihood that a user has experienced a life event that may be related to an interest or need to change the identification of a beneficiary. Moreover, in some example implementations, information regarding the movement or migration of funds associated with an event-responsive resource allocation structure, such as when an institution associated with an event-responsive resource allocation structure merges with, acquires, and/or is acquired by another institution, may be used to in determining whether there is a likelihood that a user may wish to change the identification of a beneficiary.

FIG. 3 provides a high-level process flow illustrating the implementation of a process 30 to predict a potential interest by a user to change the identification of a beneficiary associated with an event-responsive resource allocation structure in accordance with one embodiment of the invention. As illustrated in block 302, process 30 comprises receiving a set of transaction information associated with the user. In some example implementations of block 302, the set of transaction information associated with the user comprises data associated with a transaction amount, a transaction location, and a merchant name. In some such example implementations and in other example implementations, the set of transaction information may comprise other information, such as product identification information, an image of a receipt, and/or any other data associated with the transaction.

As depicted in block 304, process 30 comprises determining, based at least in part on the set of transaction information associated with the user, that a probability that the user will request to change the identification of the beneficiary of the event-responsive resource allocation structure is above a predetermined probability threshold. In some situations, changes in transaction patterns, purchased items, transaction locations, or other details of a user's usual patterns of behavior may signal a change in life circumstances, such as relationship status change, a change in residence, marriage, the birth of a child or grandchild, or other aspect of user's life. For example, if a user with no significant prior history of jewelry purchases buys a diamond ring there is an increased probability that the user is in a relationship and may intend to get married. In such a situation, a user may be more likely to wish to ensure that the user's intended spouse is named as the beneficiary on one or more of the event-responsive resource allocation structures associated with the user. In another example, if a user with adult children commences purchasing children's toys, such purchases may be indicative of the birth of a grandchild, whom the user may wish to identify as a beneficiary.

As depicted in block 306, the process 30 comprises transmitting a notification to the user. In some example implementations of block 306, the notification is one indicating that the probability that the user will request to change the identification of the beneficiary of the event-responsive resource allocation structure is above a predetermined probability threshold. In some example implementations, this notification is sent via a message that will appear on a user's mobile device. In some example implementations, the notification may take the form of a text message, SMS message, and/or an e-mail sent to the user.

As depicted in block 308, the process 30 comprises transmitting to the user a first message associated with the identification of the beneficiary of the event-responsive resource allocation structure and transmitting to the user a second message associated with the identification of the beneficiary of the event-responsive resource allocation structure, wherein the second message is sent after a predetermined interval of time has passed after the transmission of the first message. In some example implementations, the first message and/or the second message may comprise an identification of the current beneficiary of an event-responsive resource allocation structure In some such example implementations, the first message and/or the second message may include information regarding the importance of maintaining current beneficiary information, contact information for individuals qualified to provide advice or answer questions regarding financial planning, and/or invitations to confirm or update the beneficiary information associated with a given event-responsive resource allocation structure. Those skilled in the art will appreciate that the first message and/or the second message may include a broad array of content, including but not limited to content aimed at encouraging a user to take affirmative steps regarding the identification of beneficiaries associated with a user's event-responsive resource allocation structures.

In some example implementations, one or more messages sent to a user may be sent in association with determining and/or identifying a user's financial plans and goals. Such plans and goals may apply to one event-responsive resource allocation structure, a subset of such event-responsive resource allocation structures, and/or all of a user's assets. Based at least in part on the user's plans and goals, changes to the identification of the beneficiaries associated with a user's event-responsive resource allocation structures can be implemented in turn-key fashion. For example, a user may respond to a message or otherwise indicate how they wish their assets to be divided amongst one or more beneficiaries upon the occurrence of one or more events in the user's life. In such an example, the user may wish for the user's children to become beneficiaries on a group of the user's accounts when the children reach the age of majority. As the children approach the age of majority, one or more messages may be sent to the user to prompt the user to change the identification of the beneficiaries of the relevant accounts. Alternatively, once a user identifies a plan and/or a set of goals, the user may be prompted to accept and/or agree to suggested changes in the identification of one or more beneficiaries. In still another alternative example, a user may choose to have the changes in beneficiaries occur automatically upon the occurrence of an event, such as the passage of time, the birth of a child or grandchild, graduation from a school, or another life event associated with the user or a potential beneficiary.

In some example implementations of block 308, or, in some other example implementations, as a separate step, process 30 comprises transmitting to the user an offer of a reward associated with the identification of the beneficiary of the event-responsive resource allocation structure. As noted earlier, the costs associated with the misidentification of a beneficiary, or the failure to keep the identifications of beneficiaries current in keeping with a user's plans, can be substantial, both to the user, and to one or more institutions tasked with ensuring that the identified beneficiary receives the resources. Consequently, in some implementations the user may be offered a reward, such as a discount at a favored merchant, an item of value, or some other benefit to confirm and/or update the identification of a beneficiary of an event-responsive resource identification structure associated with the user.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 14/851,750 published as U.S. patent application Pub. No. 2017/0076378 | SYSTEM FOR RESTRUCTURING BASED ON PRE-DICTIVE ANALYSIS | Concurrently Herewith |
| 14/851758 published as U.S. patent application Pub. No. 2017/0076366 | UNIVERSAL TOKENIZATION SYSTEM | Concurrently Herewith |
| 14/851,623 issued as U.S. Pat. No. 10,013,714 | SYSTEM FOR SIMULATION AND IMPLEMENTATION OF DYNAMIC STATE-DEPENDENT RESOURCE RECONFIGURATION | Concurrently Herewith |
| 14/851,848 published as U.S. patent application Pub. No. 2017/0076380 | SYSTEM FOR DYNAMIC VISUALIZATION OF INDIVIDUALIZED CONSUMPTION ACROSS SHARED RESOURCE ALLOCATION STRUCTURE | Concurrently Herewith |
| 14/851765 published as U.S. patent application Pub. No. 2017/0076379 | SYSTEM FOR ANALYZING PRE-EVENT AND POST-EVENT INDIVIDUAL ACCOUNTS AND TRANSFORMING THE ACCOUNTS | Concurrently Herewith |
| 14/851,769 published as U.S. patent application Pub. No. 2017/0076271 | SYSTEM FOR OPENING AND CONSOLIDATING ACCOUNTS BASED ON AN EVENT ASSOCIATED WITH THE ACCOUNT HOLDER | Concurrently Herewith |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention maybe practiced other than as specifically described herein.

What is claimed is:

1. A system for implementing an event-responsive resource allocation structure, the system comprising:
   a memory device with non-transitory computer-readable program code stored thereon;
   a communication device;
   a processing device operatively coupled to the memory device and the communication device within a distributive network, wherein the processing device is configured to execute the computer-readable program code to:
      establish a first communication channel between a user device and a communication device;
      receive, from the user device, via one or more specialized servers communicably linked across a distributed network, a set of transaction information associated with a user, wherein the set of transaction information associated with the user comprises data associated with a transaction amount, a transaction location, and a merchant name;
      determine a change in transaction pattern associated with the user based on at least the set of information associated with the user;
      determine, based at least in part on the set of transaction information associated with the user and the change in the transaction pattern, that a probability that the user will request to change an identification of a beneficiary of an event-responsive resource allocation structure is above a predetermined probability threshold;
      determine that the user is a holder of the event-responsive resource allocation structure and that the user is authorized to change the identification of the beneficiary of the event-responsive resource allocation structures
      initiate a security check on the user device, wherein initiating further comprises:
         determine a unique identity of the user device; and
         perform a security check on the user device by (1) determining, based on the unique identity of the user device, that the user device is associated with the user, and (2) determining that the user device is not corrupted with viruses or malware;
      based on performing the security check on the user device, transmit control signals configured to cause the user device to prompt the user to provide a confirmation of the identity of the user;
      receive, via the first communication channel the confirmation of the identity of the user, wherein the confirmation of the identity of the user comprises an image of a signature of the user;
      extract data from the confirmation of the identity of the user, wherein the data comprises text-recognition data;
      calculate a confidence rating based at least in part on a comparison of the image of the signature of the user and the data extracted from the confirmation of the identity of the user to a predetermined template associated with the user;
      determine that the confidence rating exceeds a predetermined confidence threshold;
      based on performing the security check on the user device and determining that the confidence rating exceeds the predetermined confidence threshold, prompt the user for information regarding the change in the identification of the beneficiary of the event-responsive resource allocation structure, wherein prompting further comprises transmitting to the user device, an interactive form configured to receive the information regarding the change in the identification of the beneficiary from the user;
      determine that the information regarding the change in the identification of the beneficiary of the event-responsive resource allocation structure complies with one or more rules associated with the identification of the beneficiary and a specificity of the identification of the beneficiary by comparing the information regarding the change in the identification of the beneficiary of the event-responsive resource allocation structure with one or more other sources of information to confirm accuracy of the information regarding the change in the identification of the beneficiary, wherein the one or more other sources of information comprises at least public records and social media information;
      establish a second communication channel between the communication device and a system associated with an institution associated with the event-responsive resource allocation structure; and
      transmit, via the second communication channel, instructions to change the identification of the beneficiary of the event-responsive resource allocation structure based on at least determining that the change in the identification of the beneficiary of the event-responsive resource allocation structure complies with the one or more rules associated with the identification of the beneficiary and the specificity of the identification of the beneficiary, wherein the instructions comprise the information regarding the change in the identification of the beneficiary of the event-responsive resource allocation structure and the image of the signature of the user.

2. The system of claim 1, wherein the processing device is further configured to execute the computer-readable program code to:
   transmit a notification to the user indicating that the probability that the user will request to change the identification of the beneficiary of the event-responsive resource allocation structure is above the predetermined probability threshold.

3. The system of claim 2, wherein the processing device is further configured to execute the computer readable program code to:
   transmit to the user a first message associated with the identification of the beneficiary of the event-responsive resource allocation structure; and
   transmit to the user a second message associated with the identification of the beneficiary of the event-responsive resource allocation structure, wherein the second message is sent after a predetermined interval of time has passed after the transmission of the first message.

4. The system of claim 3, wherein the processing device is further configured to execute the computer readable program code to:
 transmit to the user an offer of a reward associated with the identification of the beneficiary of the event-responsive resource allocation structure.

5. The system of claim 1, wherein the processing device is further configured to execute the computer-readable program code to:
 establish a third communication channel between the communication device and a system associated with an individual authorized to verify a signature document;
 transmit to the individual authorized to verify the signature document the image of the signature and an image of a government-issued identification document associated with the user via the third communication channel; and
 receive from the individual authorized to verify the signature document an indication that the individual has verified the signature of the user.

6. A computer program product for implementing an event-responsive resource allocation structure, the computer program product comprising at least one non-transitory computer-readable medium having computer-readable program code portions embodied therein, the computer-readable program code portions comprising:
 an executable portion configured to establish a first communication channel between a user device and a communication device;
 an executable portion configured to receive, from the user device, via one or more specialized servers communicably linked across a distributed network, a set of transaction information associated with a user, wherein the set of transaction information associated with the user comprises data associated with a transaction amount, a transaction location, and a merchant name;
 an executable portion configured to establish a first communication channel between a user device and a communication device;
 an executable portion configured to receive, from the user device, via one or more specialized servers communicably linked across a distributed network, a set of transaction information associated with a user, wherein the set of transaction information associated with the user comprises data associated with a transaction amount, a transaction location, and a merchant name;
 an executable portion configured to determine a change in transaction pattern associated with the user based on at least the set of information associated with the user;
 an executable portion configured to determine, based at least in part on the set of transaction information associated with the user and the change in the transaction pattern, that a probability that the user will request to change an identification of a beneficiary of an event-responsive resource allocation structure is above a predetermined probability threshold;
 an executable portion configured to determine that the user is a holder of the event-responsive resource allocation structure and that the user is authorized to change the identification of the beneficiary of the event-responsive resource allocation structure;
 an executable portion configured to initiate a security check on the user device, wherein initiating further comprises:
  determine a unique identity of the user device; and
  perform a security check on the user device by (1) determining, based on the unique identity of the user device, that the user device is associated with the user, and (2) determining that the user device is not corrupted with viruses or malware;
 an executable portion configured to, based on performing the security check on the user device, transmit control signals configured to cause the user device to prompt the user to provide a confirmation of the identity of the user;
 an executable portion configured to receive, via the first communication channel the confirmation of the identity of the user, wherein the confirmation of the identity of the user comprises an image of a signature of the user;
 an executable portion configured to extract data from the confirmation of the identity of the user, wherein the data comprises text-recognition data;
 an executable portion configured to calculate a confidence rating based at least in part on a comparison of the image of the signature of the user and the data extracted from the confirmation of the identity of the user to a predetermined template associated with the user;
 an executable portion configured to determine that the confidence rating exceeds a predetermined confidence threshold;
 an executable portion configured to, based on performing the security check on the user device and determining that the confidence rating exceeds the predetermined confidence threshold, prompt the user for information regarding the change in the identification of the beneficiary of the event-responsive resource allocation structure, wherein prompting further comprises transmitting to the user device, an interactive form configured to receive the information regarding the change in the identification of the beneficiary from the user;
 an executable portion configured to determine that the information regarding the change in the identification of the beneficiary of the event-responsive resource allocation structure complies with one or more rules associated with the identification of the beneficiary and a specificity of the identification of the beneficiary by comparing the information regarding the change in the identification of the beneficiary of the event-responsive resource allocation structure with one or more other sources of information to confirm accuracy of the information regarding the change in the identification of the beneficiary, wherein the one or more other sources of information comprises at least public records and social media information;
 an executable portion configured to establish a second communication channel between the communication device and a system associated with an institution associated with the event-responsive resource allocation structure; and
 an executable portion configured to transmit, via the second communication channel, instructions to change the identification of the beneficiary of the event-responsive resource allocation structure based on at least determining that the change in the identification of the beneficiary of the event-responsive resource allocation structure complies with the one or more rules associated with the identification of the beneficiary and the specificity of the identification of the beneficiary, wherein the instructions comprise the information regarding the change in the identification of the beneficiary of the event-responsive resource allocation structure and the image of the signature of the user.

7. The computer program product of claim 6, wherein the computer-readable program code portions further comprise:
an executable portion configured to transmit a notification to the user indicating that the probability that the user will request to change the identification of the beneficiary of the event-responsive resource allocation structure is above the predetermined probability threshold.

8. The computer program product of claim 1, wherein the computer readable program code portions further comprise:
an executable portion configured to transmit to the user a first message associated with the identification of the beneficiary of the event-responsive resource allocation structure; and
an executable portion configured to transmit to the user a second message associated with the identification of the beneficiary of the event-responsive resource allocation structure, wherein the second message is sent after a predetermined interval of time has passed after the transmission of the first message.

9. The computer program product of claim 8, wherein the computer readable program code portions further comprise:
an executable portion configured to transmit to the user an offer of a reward associated with the identification of the beneficiary of the event-responsive resource allocation structure.

10. The computer program product of claim 6, wherein the computer-readable program code portions further comprise:
an executable portion configured to establish a third communication channel between the communication device and a system associated with an individual authorized to verify a signature document;
an executable portion configured to transmit to the individual authorized to verify the signature document the image of the signature and an image of a government-issued identification document associated with the user via the third communication channel; and
an executable portion configured to receive from the individual authorized to verify the signature document an indication that the individual has verified the signature of the user.

11. A method for implementing an event-responsive resource allocation structure, the method comprising:
establishing, by the one or more processing devices, a first communication channel between a user device and a communication device;
receiving, by the one or more processing devices, from the user device and via one or more specialized servers communicably linked across a distributed network, a set of transaction information associated with a user, wherein the set of transaction information associated with the user comprises data associated with a transaction amount, a transaction location, and a merchant name;
determining, by the one or more processing devices, a change in transaction pattern associated with the user based on at least the set of information associated with the user;
determining, by the one or more processing devices, based at least in part on the set of transaction information associated with the user and the change in the transaction pattern, that a probability that the user will request to change an identification of a beneficiary of an event-responsive resource allocation structure is above a predetermined probability threshold;
determining, by the one or more processing devices, that the user is a holder of the event-responsive resource allocation structure and that the user is authorized to change the identification of the beneficiary of the event-responsive resource allocation structure;
initiating, by the one or more processing devices, a security check on the user device, wherein initiating further comprises:
determine a unique identity of the user device; and
perform a security check on the user device by (1) determining, based on the unique identity of the user device, that the user device is associated with the user, and (2) determining that the user device is not corrupted with viruses or malware;
based on performing the security check on the user device, transmitting, by the one or more processing devices, control signals configured to cause the user device to prompt to provide a confirmation of the identity of the user;
receiving, by one or more processing devices, via the first communication channel, the confirmation of the identity of the user, wherein the confirmation of the identity of the user comprises an image of a signature of the user;
extracting, by the one or more processing devices, data from the confirmation of the identity of the user, wherein the data comprises text-recognition data;
calculating, by the one or more processing devices, a confidence rating based at least in part on a comparison of the image of the signature of the user and the data extracted from the confirmation of the identity of the user to a predetermined template associated with the user;
determining, by the one or more processing devices, that the confidence rating exceeds a predetermined confidence threshold;
based on performing the security check on the user device and determining that the confidence rating exceeds the predetermined confidence threshold, prompting the user, by the one or more processing devices, for information regarding the change in the identification of the beneficiary of the event-responsive resource allocation structure, wherein prompting further comprises transmitting to the user device, an interactive form configured to receive the information regarding the change in the identification of the beneficiary from the user;
determining, by the one or more processing devices, that the information regarding the change in the identification of the beneficiary of the event-responsive resource allocation structure complies with one or more rules associated with the identification of the beneficiary and a specificity of the identification of the beneficiary by comparing the information regarding the change in the identification of the beneficiary of the event-responsive resource allocation structure with one or more other sources of information to confirm accuracy of the information regarding the change in the identification of the beneficiary, wherein the one or more other sources of information comprises at least public records and social media information;
establishing, by the one or more processing devices, a second communication channel between the communication device and a system associated with an institution associated with the event-responsive resource allocation structure; and transmitting, via the second communication channel, instructions to change the identification of the beneficiary of the event-responsive resource allocation structure based on at least determining that the change in the identification of the beneficiary of the event-responsive resource allocation structure complies with the one or more rules associated with the identification of the beneficiary and the specificity of the identification of the beneficiary, wherein the instructions comprise the information regarding the change in the identification of the beneficiary of the event-responsive resource allocation structure and the image of the signature of the user.

12. The method of claim 11, wherein method further comprises:

transmitting a notification to the user indicating that the probability that the user will request to change the identification of the beneficiary of the event-responsive resource allocation structure is above the predetermined probability threshold.

13. The method of claim 12, wherein the method further comprises:

transmitting to the user a first message associated with the identification of the beneficiary of the event-responsive resource allocation structure; and transmitting to the user a second message associated with the identification of the beneficiary of the event-responsive resource allocation structure, wherein the second message is sent after a predetermined interval of time has passed after the transmission of the first message.

14. The method of claim 13, wherein the method further comprises:

transmitting to the user an offer of a reward associated with the identification of the beneficiary of the event-responsive resource allocation structure.

15. The system of claim 1, wherein the processing device is further configured to execute the computer-readable program code to:

receive a request from the user to change the identification of the beneficiary of the event-responsive resource allocation structure, wherein the request is received via a transmission sent from the user device associated with the user;

initiate the security check on the user device based on at least receiving the request from the user device, to determine whether the user device requesting the change to the event-responsive resource allocation structure is a device associated with the user and is not compromised; and generate a security confidence rating associated with the user device based on at least performing the security check.

16. The computer program product of claim 6, wherein the computer-readable program code portions further comprise:

an executable portion configured to receive a request from the user to change the identification of the beneficiary of the event-responsive resource allocation structure, wherein the request is received via a transmission sent from the user device associated with the user;

an executable portion configured to initiate the security check on the user device based on at least receiving the request from the user device, to determine whether the user device requesting the change to the event-responsive resource allocation structure is a device associated with the user and is not compromised; and an executable portion configured to generate a security confidence rating associated with the user device based on at least performing the security check.

17. The method of claim 11, wherein method further comprises:

receiving a request from the user to change the identification of the beneficiary of the event-responsive resource allocation structure, wherein the request is received via a transmission sent from the user device associated with the user;

initiating the security check on the user device based on at least receiving the request from the user device, to determine whether the user device requesting the change to the event-responsive resource allocation structure is a device associated with the user and is not compromised; and generating a security confidence rating associated with the user device based on at least performing the security check.

18. The method of claim 11, wherein the method further comprises:

establishing a third communication channel between the communication device and a system associated with an individual authorized to verify a signature document;

transmitting to the individual authorized to verify the signature document the image of the signature and an image of a government-issued identification document associated with the user via the third communication channel; and receiving from the individual authorized to verify the signature document an indication that the individual has verified the signature of the user.

19. The system of claim 1, wherein the processing device is further configured to execute the computer-readable program code to:

receive one or more requirements from the system associated with the institution associated with the event-responsive resource allocation structure, wherein the one or more requirements comprises at least a degree of specificity associated with the identity of the beneficiary.

20. The method of claim 11, wherein the method further comprises:

receiving one or more requirements from the system associated with the institution associated with the event-responsive resource allocation structure, wherein the one or more requirements comprises at least a degree of specificity associated with the identity of the beneficiary.

* * * * *